(12) United States Patent
Swoboda

(10) Patent No.: US 9,536,025 B2
(45) Date of Patent: Jan. 3, 2017

(54) TRANSMITTING LSB TIMESTAMP DATUM IN PARALLEL AND MSB IN SERIES

(71) Applicant: Texas Instruments Incorporated, Dallas, TX (US)

(72) Inventor: Gary L. Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 113 days.

(21) Appl. No.: 14/547,866

(22) Filed: Nov. 19, 2014

(65) Prior Publication Data

US 2015/0082264 A1    Mar. 19, 2015

Related U.S. Application Data

(62) Division of application No. 12/971,930, filed on Dec. 17, 2010, now Pat. No. 8,924,767.

(60) Provisional application No. 61/287,444, filed on Dec. 17, 2009.

(51) Int. Cl.
| | | |
|---|---|---|
| G06F 1/04 | (2006.01) | |
| G06F 1/12 | (2006.01) | |
| G06F 5/06 | (2006.01) | |
| G06F 17/50 | (2006.01) | |
| G06F 13/38 | (2006.01) | |
| G06F 1/14 | (2006.01) | |

(52) U.S. Cl.
CPC ............. *G06F 17/5031* (2013.01); *G06F 1/04* (2013.01); *G06F 1/14* (2013.01); *G06F 13/38* (2013.01); *G06F 2217/14* (2013.01); *G06F 2217/62* (2013.01); *G06F 2217/84* (2013.01); *Y02T 10/82* (2013.01)

(58) Field of Classification Search
CPC .......... G06F 17/5031; G06F 1/04; G06F 1/14; G06F 13/38; G06F 2217/14; G06F 2217/62; G06F 2217/84; Y02T 10/82
USPC ........................................................ 713/600
See application file for complete search history.

(56) References Cited

U.S. PATENT DOCUMENTS

| | | | | |
|---|---|---|---|---|
| 6,032,190 A * | 2/2000 | Bremer | ................... | H04L 49/25 370/389 |
| 2004/0105423 A1* | 6/2004 | Koehler | ................... | H04L 29/06 370/351 |
| 2007/0162155 A1* | 7/2007 | Zucker | ................... | G06F 13/385 700/1 |
| 2009/0282177 A1* | 11/2009 | Chen | ....................... | G06F 13/20 710/110 |
| 2009/0285497 A1* | 11/2009 | Choi | ..................... | H04N 19/593 382/233 |
| 2011/0239030 A1* | 9/2011 | Ware | ........................ | G11C 7/04 713/400 |

* cited by examiner

*Primary Examiner* — Robert Cassity
(74) *Attorney, Agent, or Firm* — Lawrence J. Bassuk; Charles A. Brill; Frank D. Cimino

(57) ABSTRACT

A timestamp generator generates a timestamp value having a predetermined number of most significant bits and a predetermined number of least significant bits. The least significant bits are transmitted to a client via a parallel data bus. The most significant bits are transmitted to the client sequentially via a series data bus. Each client receives the parallel least significant bits and the series most significant bits and assembles a complete time stamp value.

13 Claims, 10 Drawing Sheets

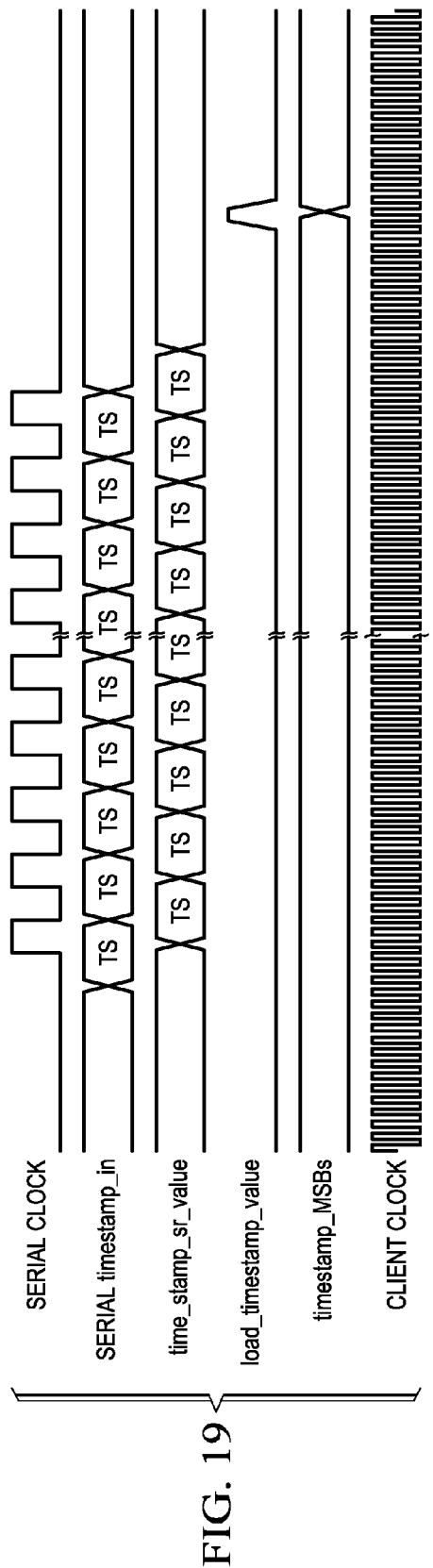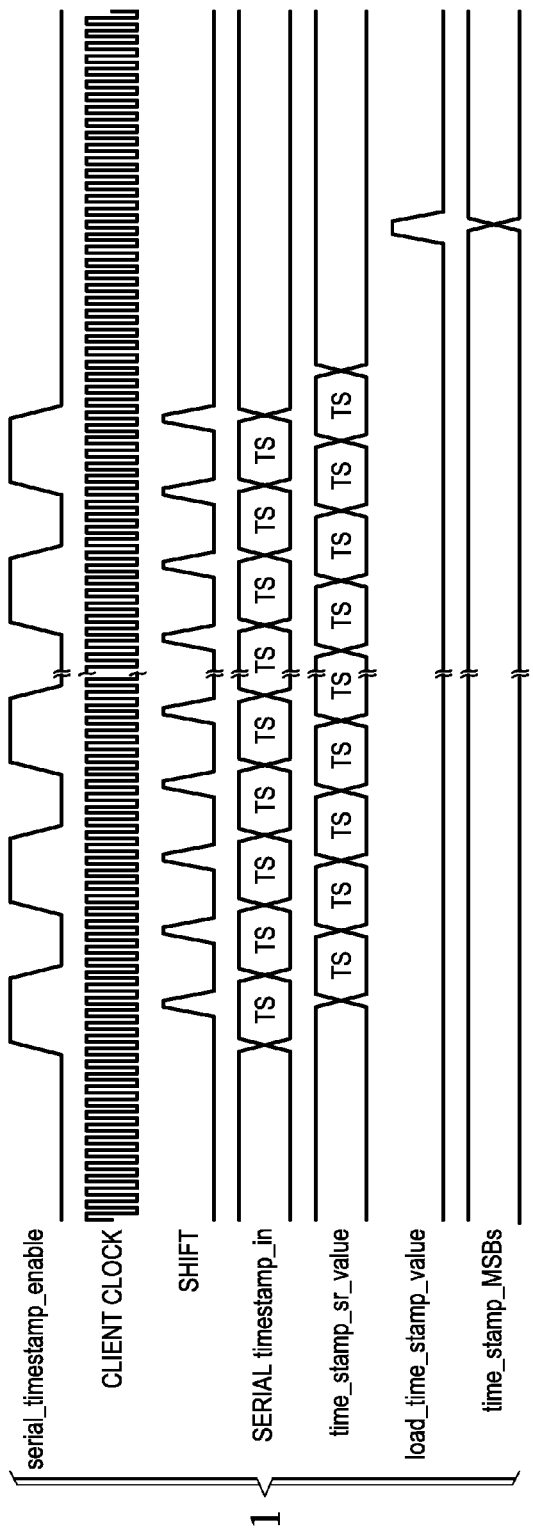

TRANSMITTING LSB TIMESTAMP DATUM IN PARALLEL AND MSB IN SERIES

CLAIM OF PRIORITY

This application is a Divisional of prior application Ser. No. 12/971,930, filed Dec. 17, 2010, now U.S. Pat. No. 8,924,767, issued Dec. 30, 2014;

And claims priority under 35 U.S.C. 119(e)(1) to U.S. Provisional Application No. 61/287,444 filed Dec. 17, 2009.

TECHNICAL FIELD OF THE INVENTION

The technical field of this invention is time stamping for emulation and debug of electronic systems.

BACKGROUND OF THE INVENTION

Advanced wafer lithography and surface-mount packaging technology are integrating increasingly complex functions at both the silicon and printed circuit board level of electronic design. Diminished physical access to circuits for test and emulation is an unfortunate consequence of denser designs and shrinking interconnect pitch. Designed-in testability is needed so the finished product is both controllable and observable during test and debug. Any manufacturing defect is preferably detectable during final test before a product is shipped. This basic necessity is difficult to achieve for complex designs without taking testability into account in the logic design phase so automatic test equipment can test the product.

In addition to testing for functionality and for manufacturing defects, application software development requires a similar level of simulation, observability and controllability in the system or sub-system design phase. The emulation phase of design should ensure that a system of one or more ICs (integrated circuits) functions correctly in the end equipment or application when linked with the system software. With the increasing use of ICs in the automotive industry, telecommunications, defense systems, and life support systems, thorough testing and extensive real-time debug becomes a critical need.

Functional testing, where the designer generates test vectors to ensure conformance to specification, still remains a widely used test methodology. For very large systems this method proves inadequate in providing a high level of detectable fault coverage. Automatically generated test patterns are desirable for full testability, and controllability and observability. These are key goals that span the full hierarchy of test from the system level to the transistor level.

Another problem in large designs is the long time and substantial expense involved in design for test. It would be desirable to have testability circuitry, system and methods that are consistent with a concept of design-for-reusability. In this way, subsequent devices and systems can have a low marginal design cost for testability, simulation and emulation by reusing the testability, simulation and emulation circuitry, systems and methods that are implemented in an initial device. Without a proactive testability, simulation and emulation plan, a large amount of subsequent design time would be expended on test pattern creation and upgrading.

Even if a significant investment were made to design a module to be reusable and to fully create and grade its test patterns, subsequent use of a module may bury it in application specific logic. This would make its access difficult or impossible. Consequently, it is desirable to avoid this pitfall.

The advances of IC design are accompanied by decreased internal visibility and control, reduced fault coverage and reduced ability to toggle states, more test development and verification problems, increased complexity of design simulation and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment and tighter tolerances.

Emulation technology utilizing scan based emulation and multiprocessing debug was introduced more than 10 years ago. In 1988, the change from conventional in circuit emulation to scan based emulation was motivated by design cycle time pressures and newly available space for on-chip emulation. Design cycle time pressure was created by three factors. Higher integration levels, such as increased use of on-chip memory, demand more design time. Increasing clock rates mean that emulation support logic causes increased electrical intrusiveness. More sophisticated packaging causes emulator connectivity issues. Today these same factors, with new twists, are challenging the ability of a scan based emulator to deliver the system debug facilities needed by today's complex, higher clock rate, highly integrated designs. The resulting systems are smaller, faster, and cheaper. They have higher performance and footprints that are increasingly dense. Each of these positive system trends adversely affects the observation of system activity, the key enabler for rapid system development. The effect is called "vanishing visibility."

FIG. 1 illustrates the trend in visibility and control over time and greater system integration in accordance with the prior art. Application developers prefer the optimum visibility level illustrated in FIG. 1. This optimum visibility level provides visibility and control of all relevant system activity. The steady progression of integration levels and increases in clock rates steadily decrease the actual visibility and control available over time. These forces create a visibility and control gap, the difference between the optimum visibility and control level and the actual level available. Over time, this gap will widen. Application development tool vendors are striving to minimize the gap growth rate. Development tools software and associated hardware components must do more with less resources and in different ways. Tackling this ease of use challenge is amplified by these forces.

With today's highly integrated System-On-a-Chip (SOC) technology, the visibility and control gap has widened dramatically over time. Traditional debug options such as logic analyzers and partitioned prototype systems are unable to keep pace with the integration levels and ever increasing clock rates of today's systems. As integration levels increase, system buses connecting numerous subsystem components move on chip, denying traditional logic analyzers access to these buses. With limited or no significant bus visibility, tools like logic analyzers cannot be used to view system activity or provide the trigger mechanisms needed to control the system under development. A loss of control accompanies this loss in visibility, as it is difficult to control things that are not accessible.

To combat this trend, system designers have worked to keep these buses exposed. Thus the system components were built in a way that enabled the construction of prototyping systems with exposed buses. This approach is also under siege from the ever-increasing march of system clock rates. As the central processing unit (CPU) clock rates increase, chip to chip interface speeds are not keeping pace. Developers find that a partitioned system's performance does not keep pace with its integrated counterpart, due to interface wait states added to compensate for lagging chip to chip communication rates. At some point, this performance degradation reaches intolerable levels and the partitioned prototype system is no longer a viable debug option. In the current era production devices must serve as the platform for application development.

Increasing CPU clock rates are also limiting availability of other simple visibility mechanisms. Since the CPU clock rates can exceed the maximum I/O state rates, visibility ports exporting information in native form can no longer keep up with the CPU. On-chip subsystems are also operated at clock rates that are slower than the CPU clock rate. This approach may be used to simplify system design and reduce power consumption. These developments mean simple visibility ports can no longer be counted on to deliver a clear view of CPU activity. As visibility and control diminish, the development tools used to develop the application become less productive. The tools also appear harder to use due to the increasing tool complexity required to maintain visibility and control. The visibility, control, and ease of use issues created by systems-on-a-chip tend to lengthen product development cycles.

Even as the integration trends present developers with a tough debug environment, they also present hope that new approaches to debug problems will emerge. The increased densities and clock rates that create development cycle time pressures also create opportunities to solve them. On-chip, debug facilities are more affordable than ever before. As high speed, high performance chips are increasingly dominated by very large memory structures, the system cost associated with the random logic accompanying the CPU and memory subsystems is dropping as a percentage of total system cost. The incremental cost of several thousand gates is at an all time low. Circuits of this size may in some cases be tucked into a corner of today's chip designs. The incremental cost per pin in today's high density packages has also dropped. This makes it easy to allocate more pins for debug. The combination of affordable gates and pins enables the deployment of new, on-chip emulation facilities needed to address the challenges created by systems-on-a-chip.

When production devices also serve as the application debug platform, they must provide sufficient debug capabilities to support time to market objectives. Since the debugging requirements vary with different applications, it is highly desirable to be able to adjust the on-chip debug facilities to balance time to market and cost needs. Since these on-chip capabilities affect the chip's recurring cost, the scalability of any solution is of primary importance. "Pay only for what you need" should be the guiding principle for on-chip tools deployment. In this new paradigm, the system architect may also specify the on-chip debug facilities along with the remainder of functionality, balancing chip cost constraints and the debug needs of the product development team.

FIG. 2 illustrates a prior art emulator system 100 including four emulator components. These four components are: a debugger application program 110; a host computer 120; an emulation controller 130; and on-chip debug facilities 140. FIG. 2 illustrates the connections of these components. Host computer 120 is connected to an emulation controller 130 external to host 120. Emulation controller 130 is also connected to target system 140. The user preferably controls the target application on target system 140 through debugger application program 110.

Host computer 120 is generally a personal computer. Host computer 120 provides access the debug capabilities through emulator controller 130. Debugger application program 110 presents the debug capabilities in a user-friendly form via host computer 120. The debug resources are allocated by debug application program 110 on an as needed basis, relieving the user of this burden. Source level debug utilizes the debug resources, hiding their complexity from the user. Debugger application program 110 together with the on-chip trace and triggering facilities provide a means to select, record, and display chip activity of interest. Trace displays are automatically correlated to the source code that generated the trace log. The emulator provides both the debug control and trace recording function.

The debug facilities are preferably programmed using standard emulator debug accesses through a JTAG or similar serial debug interface. Since pins are at a premium, the preferred embodiment of the invention provides for the sharing of the debug pin pool by trace, trigger, and other debug functions with a small increment in silicon cost. Fixed pin formats may also be supported. When the pin sharing option is deployed, the debug pin utilization is determined at the beginning of each debug session before target system 140 is directed to run the application program. This maximizes the trace export bandwidth. Trace bandwidth is maximized by allocating the maximum number of pins to trace.

The debug capability and building blocks within a system may vary. Debugger application program 100 therefore establishes the configuration at runtime. This approach requires the hardware blocks to meet a set of constraints dealing with configuration and register organization. Other components provide a hardware search capability designed to locate the blocks and other peripherals in the system memory map. Debugger application program 110 uses a search facility to locate the resources. The address where the modules are located and a type ID uniquely identifies each block found. Once the IDs are found, a design database may be used to ascertain the exact configuration and all system inputs and outputs.

Host computer 120 generally includes at least 64 Mbytes of memory and is capable of running Windows 95, SR-2, Windows NT, or later versions of Windows. Host computer 120 must support one of the communications interfaces required by the emulator. These may include: Ethernet 10T and 100T, TCP/IP protocol; Universal Serial Bus (USB); Firewire IEEE 1394; and parallel port such as SPP, EPP and ECP.

Host computer 120 plays a major role in determining the real-time data exchange bandwidth. First, the host to emulator communication plays a major role in defining the maximum sustained real-time data exchange bandwidth because emulator controller 130 must empty its receive real-time data exchange buffers as fast as they are filled. Secondly, host computer 120 originating or receiving the real-time data exchange data must have sufficient processing capacity or disc bandwidth to sustain the preparation and transmission or processing and storing of the received real-time data exchange data. A state of the art personal computer with a Firewire communication channel (IEEE 1394) is preferred to obtain the highest real-time data exchange bandwidth. This bandwidth can be as much as ten times greater performance than other communication options.

Emulation controller 130 provides a bridge between host computer 120 and target system 140. Emulation controller 130 handles all debug information passed between debugger application program 110 running on host computer 120 and a target application executing on target system 140. A presently preferred minimum emulator configuration supports all of the following capabilities: real-time emulation; real-time data exchange; trace; and advanced analysis.

Emulation controller 130 preferably accesses real-time emulation capabilities such as execution control, memory, and register access via a 3, 4, or 5 bit scan based interface. Real-time data exchange capabilities can be accessed by scan or by using three higher bandwidth real-time data exchange formats that use direct target to emulator connections other than scan. The input and output triggers allow other system components to signal the chip with debug events and vice-versa. Bit I/O allows the emulator to stimulate or monitor system inputs and outputs. Bit I/O can be used to support factory test and other low bandwidth, non-time-critical emulator/target operations. Extended operating modes are used to specify device test and emulation operating modes. Emulator controller 130 is partitioned into communication and emulation sections. The communication section supports host communication links while the emulation section interfaces to the target, managing target debug functions and the device debug port. Emulation controller 130 communicates with host computer 120 using one of industry standard communication links outlined earlier herein. The host to emulator connection is established with off the shelf cabling technology. Host to emulator separation is governed by the standards applied to the interface used.

Emulation controller 130 communicates with the target system 140 through a target cable or cables. Debug, trace, triggers, and real-time data exchange capabilities share the target cable, and in some cases, the same device pins. More than one target cable may be required when the target system 140 deploys a trace width that cannot be accommodated in a single cable. All trace, real-time data exchange, and debug communication occurs over this link. Emulator controller 130 preferably allows for a target to emulator separation of at least two feet. This emulation technology is capable of test clock rates up to 50 MHZ and trace clock rates from 200 to 300 MHZ, or higher. Even though the emulator design uses techniques that should relax target system 140 constraints, signaling between emulator controller 130 and target system 140 at these rates requires design diligence. This emulation technology may impose restrictions on the placement of chip debug pins, board layout, and requires precise pin timings. On-chip pin macros are provided to assist in meeting timing constraints.

The on-chip debug facilities offer the developer a rich set of development capability in a two tiered, scalable approach. The first tier delivers functionality utilizing the real-time emulation capability built into a CPU's mega-modules. This real-time emulation capability has fixed functionality and is permanently part of the CPU while the high performance real-time data exchange, advanced analysis, and trace functions are added outside of the core in most cases. The capabilities are individually selected for addition to a chip. The addition of emulation peripherals to the system design creates the second tier functionality. A cost-effective library of emulation peripherals contains the building blocks to create systems and permits the construction of advanced analysis, high performance real-time data exchange, and trace capabilities. In the preferred embodiment five standard debug configurations are offered, although custom configurations are also supported. The specific configurations are covered later herein.

Transmission of a very large timestamp value to a number of timestamp clients uses substantial chip routing area.

SUMMARY OF THE INVENTION

This invention minimizes chip routing resources in transmission of timestamp values to timestamp clients. This invention employs a mix of both parallel and serial methods.

A timestamp generator generates a timestamp value having a predetermined number of most significant bits and a predetermined number of least significant bits. The least significant bits are transmitted to a client via a parallel data bus. The most significant bits are transmitted to the client sequentially via a series data bus. Each client receives the parallel least significant bits and the series most significant bits and assembles a complete timestamp value.

BRIEF DESCRIPTION OF THE DRAWINGS

These and other aspects of this invention are illustrated in the drawings, in which:

FIG. 19 illustrates various signals in a first embodiment of reception of the serial most significant bits of the time stamp of this invention;

FIG. 21 illustrates various signals in a second embodiment of reception of the serial most significant bits of the time stamp of this invention;

DETAILED DESCRIPTION OF PREFERRED EMBODIMENTS

Figure 3:
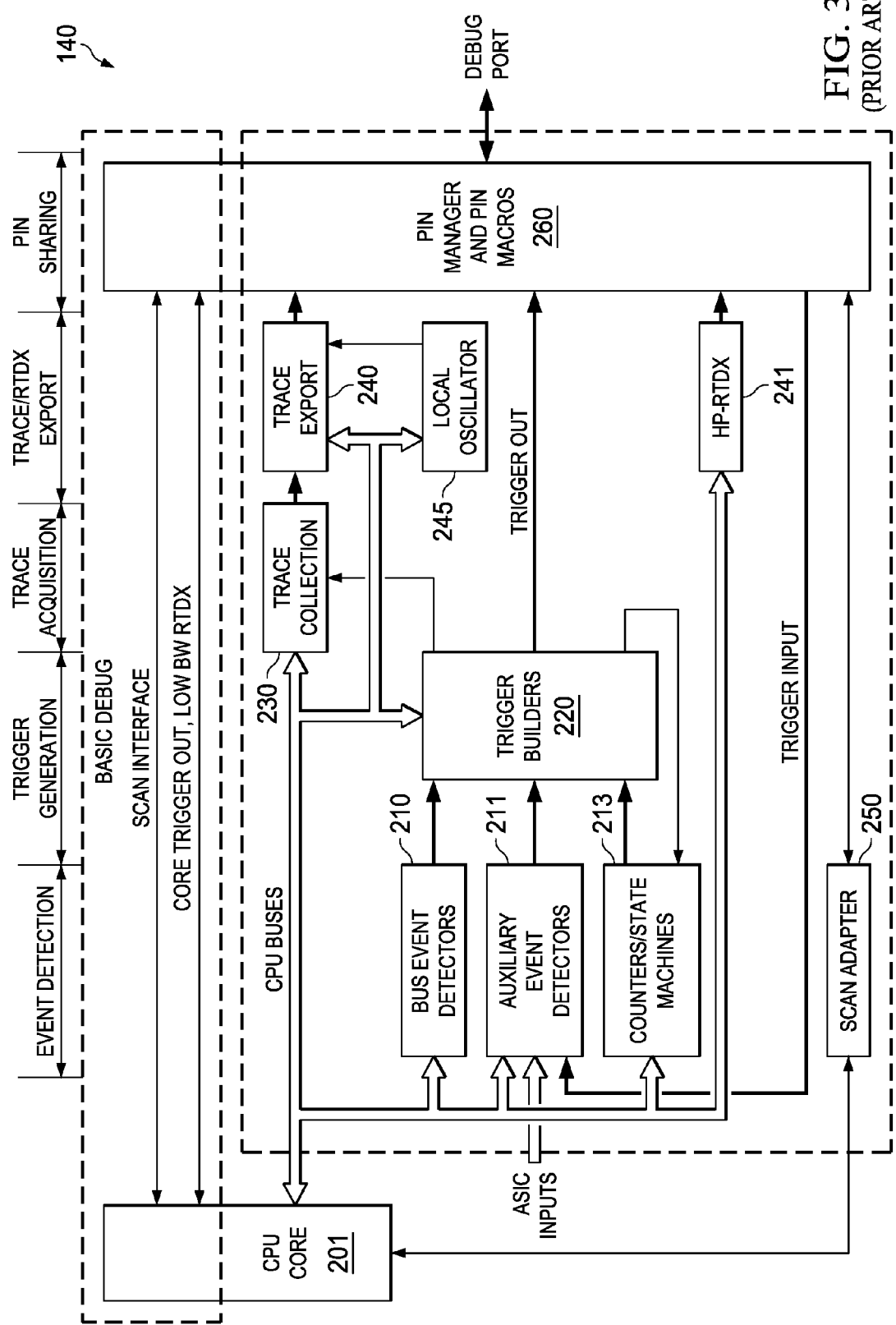
FIG. 3 illustrates in block diagram form a typical integrated circuit employing configurable emulation capability of the prior art.

FIG. 3 illustrates an example of one on-chip debug architecture embodying target system 140. The architecture uses several module classes to create the debug function. One of these classes is event detectors including bus event detectors 210, auxiliary event detectors 211 and counters/state machines 213. A second class of modules is trigger generators including trigger builders 220. A third class of modules is data acquisition including trace collection 230 and formatting. A fourth class of modules is data export including trace export 240, and real-time data exchange export 241. Trace export 240 is controlled by clock signals from local oscillator 245. Local oscillator 245 will be described in detail below. A final class of modules is scan adaptor 250, which interfaces scan input/output to CPU core 201. Final data formatting and pin selection occurs in pin manager and pin micros 260.

The size of the debug function and its associated capabilities for any particular embodiment of a system-on-chip may be adjusted by either deleting complete functions or limiting the number of event detectors and trigger builders deployed. Additionally, the trace function can be incrementally increased from program counter trace only to program counter and data trace along with ASIC and CPU generated data. The real-time data exchange function may also be optionally deployed. The ability to customize on-chip tools changes the application development paradigm. Historically, all chip designs with a given CPU core were limited to a fixed set of debug capability. Now, an optimized debug capability is available for each chip design. This paradigm change gives system architects the tools needed to manage product development risk at an affordable cost. Note that the same CPU core may be used with differing peripherals with differing pin outs to embody differing system-on-chip products. These differing embodiments may require differing debug and emulation resources. The modularity of this invention permits each such embodiment to include only the necessary debug and emulation resources for the particular system-on-chip application.

The real-time emulation debug infrastructure component is used to tackle basic debug and instrumentation operations related to application development. It contains all execution control and register visibility capabilities and a minimal set of real-time data exchange and analysis such as breakpoint and watchpoint capabilities. These debug operations use on-chip hardware facilities to control the execution of the application and gain access to registers and memory. Some of the debug operations which may be supported by real-time emulation are: setting a software breakpoint and observing the machine state at that point; single step code advance to observe exact instruction by instruction decision making; detecting a spurious write to a known memory location; and viewing and changing memory and peripheral registers.

Real-time emulation facilities are incorporated into a CPU mega-module and are woven into the fabric of CPU core 201. This assures designs using CPU core 201 have sufficient debug facilities to support debugger application program 110 baseline debug, instrumentation, and data transfer capabilities. Each CPU core 201 incorporates a baseline set of emulation capabilities. These capabilities include but are not limited to: execution control such as run, single instruction step, halt and free run; displaying and modifying registers and memory; breakpoints including software and minimal hardware program breakpoints; and watchpoints including minimal hardware data breakpoints.

Timestamps are generally regarding as part of instrumentation data. In a system where emulation or debug is desired, it is desirable to collect information about system operation with software and hardware monitors. This information becomes even more valuable when the time of information collection is also recorded and made available. The time at which information is collected is typically marked with a timestamp.

One method of timestamping presumes a common time base is available to all functions (timestamp clients) generating a timestamp. As the operating frequency of systems increase, the number of bits used for a timestamp can generally increase proportionally. When the timestamp must be delivered to a number of functions (timestamp Clients) within a chip, the number of routing channels required to deliver the timestamp to all destinations becomes significant. This invention covers methods that may be used to convey a timestamp value to many points in a system while minimizing the number of routing channels needed to provide the timestamp value to the functions.

A timestamp value is generally created with the highest frequency clock within the system when a timestamp with maximum resolution is desired. This may provide a timestamp of 64 or more bits in width. The timestamp value is represented as timestamp[n:00]: where bit n is the most significant bit (MSB); and bit 00 is the least significant bit (LSB).

The characteristics of this timestamp value are listed below. A timestamp value may be coded as: a binary value; a Gray coded value; or some other encoding format. When a timestamp is binary coded, beginning with bit [01], each bit n toggles at one half the rate of bit [n−1]. When a timestamp value is Gray coded, beginning with bit [01], each bit n toggles at one half the rate of bit [n−1]. For both binary coded and Gray coded timestamp values, the toggle rates of more significant bits are slow or very slow when compared to the toggle rates of less significant bits. The point at which bit [n] of the timestamp toggles is determined by the value of timestamp bits [n−1:0]

Figure 1:
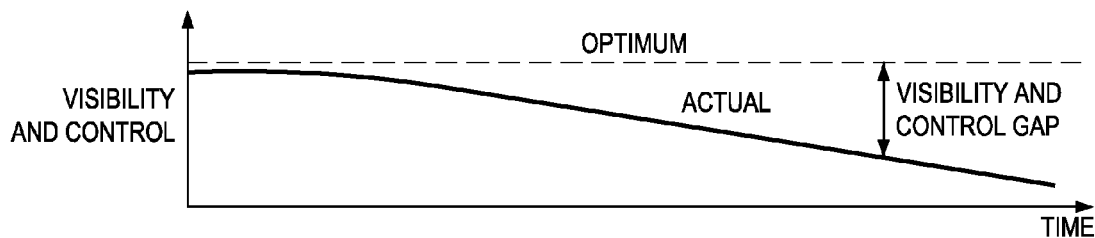
FIG. 1 illustrates the visibility and control of typical integrated circuits as a function of time due to increasing system integration.
Figure 2:
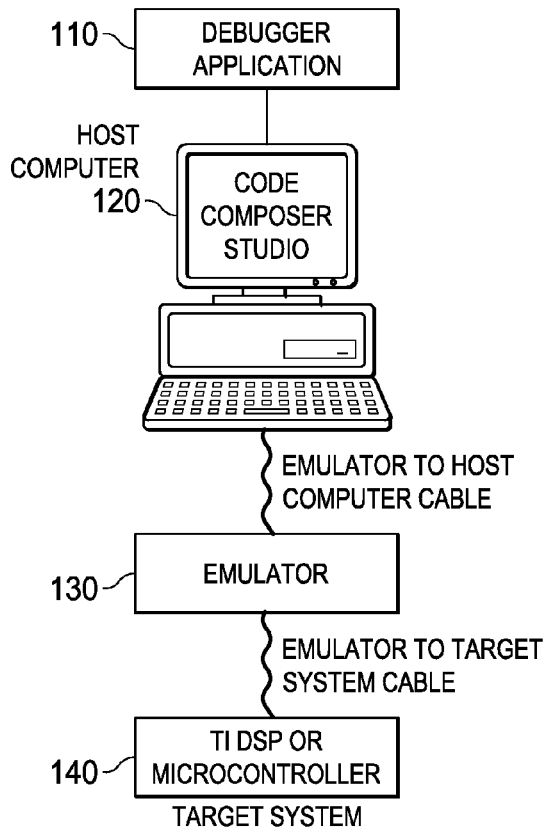
FIG. 2 illustrates a prior art emulation system to which this invention is applicable.
Figure 4:
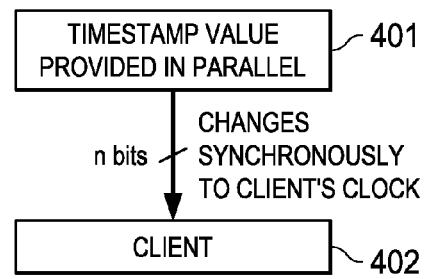
FIG. 4 illustrates a first prior art timestamp distribution technique.
Figure 5:
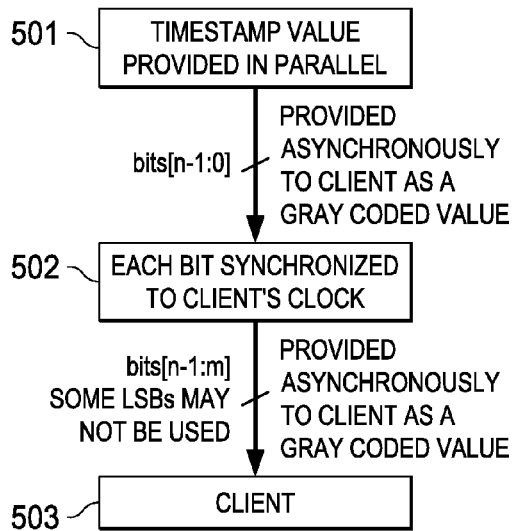
FIG. 5 illustrates a second prior art timestamp distribution technique.
Figure 6:
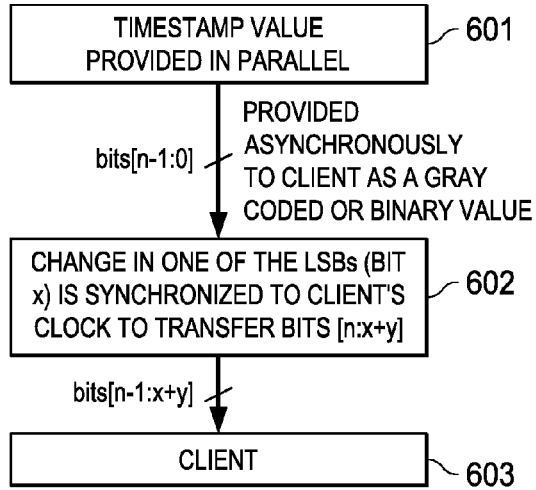
FIG. 6 illustrates a third prior art timestamp distribution technique.

FIGS. 4 to 6 illustrate several techniques for presentation of timestamps in the prior art. FIG. 4 illustrates a first prior art technique. Timestamp source 401 supplies a timestamp value as n parallel bits to client 402. The n-bit timestamp is supplied each client 402 synchronous to a clock of client 402 or a sub-multiple of this clock.

FIG. 5 illustrates a second prior art technique. Timestamp source 501 supplies a timestamp value of parallel bits [n−1,0] as an asynchronous Gray coded value. Synchronizer 502 synchronizes each bit of the Gray coded value to a client clock or sub-multiple of the client clock. Synchronizer 502 supplies the bit synchronized MSB bits [n−1:m] of the timestamp value to client 503. Note that the omitted LSBs are not used. Generally one synchronizer 502 is provided for each client 503.

FIG. 6 illustrates a third prior art technique. Timestamp source 601 supplies a timestamp value of parallel bits [n−1,0] as an asynchronous Gray coded value. Synchronizer 602 synchronizes the timestamp value change in one of the LSBs to the client bit [x]. Synchronizer 602 transfers MSB bits [n−1:x+y] to client 603. The omitted LSBs are not used. Generally one synchronizer 602 is provided for each client 603.

In each of the prior art techniques illustrated in FIGS. 4 to 6 an n-bit wide bus broadcasts a timestamp value to all timestamp clients. When some or all of these clients are located in areas of a chip where routing is congested, the number of routing channels required to provide the timestamp to these clients sometimes seems excessive. This invention is an alternate means of providing the timestamp value to clients on chip.

This invention supplies the MSBs of the timestamp value to the client serially. These MSBs of the timestamp value change infrequently when compared to the toggle rate of the client clock. This invention includes several variations of encoding the serial and parallel presentation of a timestamp value shown in Table 1 and described below.

TABLE 1

| Serial Transmission (MSBs) | Parallel Transmission (LSBs) |
|---|---|
| Gray coded | Gray coded |
| Gray coded | Binary coded |
| Binary coded | Gray coded |
| Binary coded | Binary coded |

Other timestamp encoding are possible and are within the scope of this invention. With each of these techniques, the serial transmission of the MSBs of the timestamp is the next value of the MSBs so that this value may be presented to the timestamp in parallel when the count represented by the LSBs presented in parallel rolls over.

Figure 7:
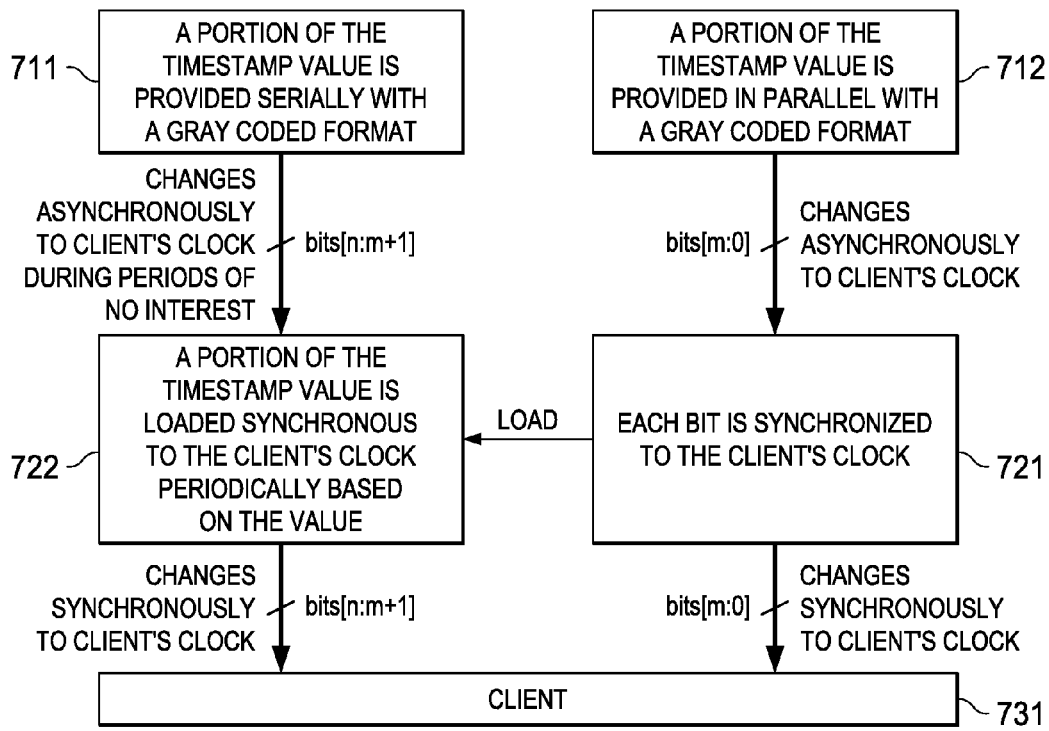
FIG. 7 illustrates schematically a first embodiment of timestamp value transmission of this invention.
Figure 8:
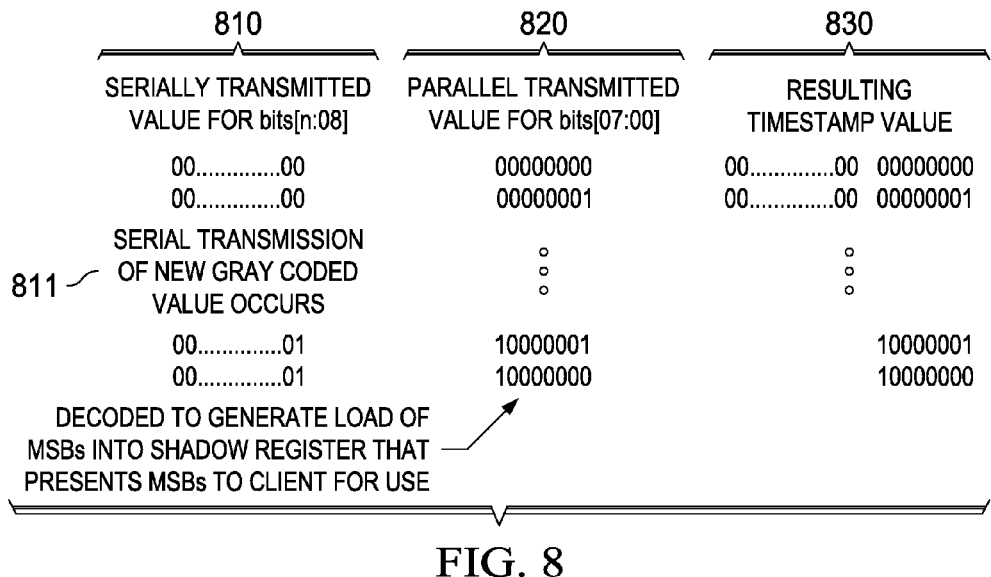
FIG. 8 illustrates an example of the embodiment of FIG. 7.
Figure 9:
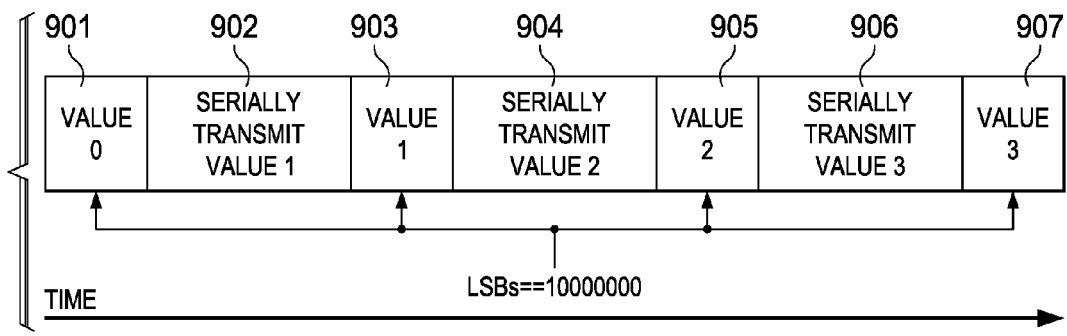
FIG. 9 illustrates the manner of transmitting the serial most significant bits of the time stamp value of the embodiment of FIG. 7.

FIGS. 7 to 9 illustrate the first technique (Gray coded MSBs and Gray coded LSBs). FIG. 7 illustrates the timestamp value or data transmission schematically. First timestamp source 711 supplies MSBs of one timestamp value or datum of serial bits [n,m+1] as an asynchronous Gray coded value. The MSB asynchronous Gray coded value is transmitted during periods of no interest. Because these MSBs change slowly this is generally possible. Second timestamp source 712 supplies LSBs of another timestamp value or datum of parallel bits [m,0] as an asynchronous Gray coded value. The LSB asynchronous Gray coded value is asynchronous to the client clock. First synchronizer 721 synchronizes each bit of the LSBs bits [m,0] to the client clock. Second synchronizer 722 keeps a timestamp value corresponding to the MSBs in a shadow register as updated by first timestamp source 711. Second synchronizer 722 supplies the MSBs of the timestamp value synchronous with the client clock as triggered by a load signal from first synchronizer 721 to client 731. This load is triggered by a rollover within the LSBs. Client 731 receives the MSB bits [n:m+1] from second synchronizer 722 and the LSB bits [m:0] from first synchronizer 721. All bits are received by client 731 are synchronous with the client clock.

FIG. 8 illustrates an example of this operation. Column 810 is the serial MSBs, column 820 is the parallel LSBs and column 830 is resultant complete timestamp value. A rollover toggle in LSBs 820 at 811 triggers the load of MSBs 810. As previously noted, this serial portion of the MSBs is coded for the next value. Therefore the load triggered by the rollover in the LSBs loads the correct value.

FIG. 9 illustrates the manner of transmitting the serial MSBs. Time slots 901, 903, 905 and 907 signal when a rollover toggle occurs in the LSBs. During time slot 902 the serial MSBs for the value 1 are transmitted to second synchronizer 722. This value 1 is loaded into client 731 upon the value 1 signal in time slot 903. During time slot 904 the serial MSBs for the value 2 are transmitted to second synchronizer 722. This value 2 is loaded into client 731 upon the value 2 signal in time slot 905. During time slot 906 the serial MSBs for the value 3 are transmitted to second synchronizer 722. This value 3 is loaded into client 731 upon the value 3 signal in time slot 907.

Figure 12:
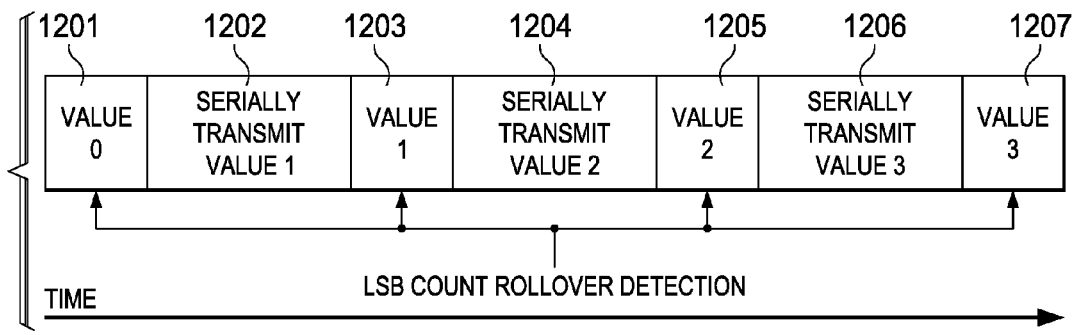
FIG. 12 illustrates the manner of transmitting the serial most significant bits of the time stamp value of the embodiment of FIG. 10.
Figure 10:
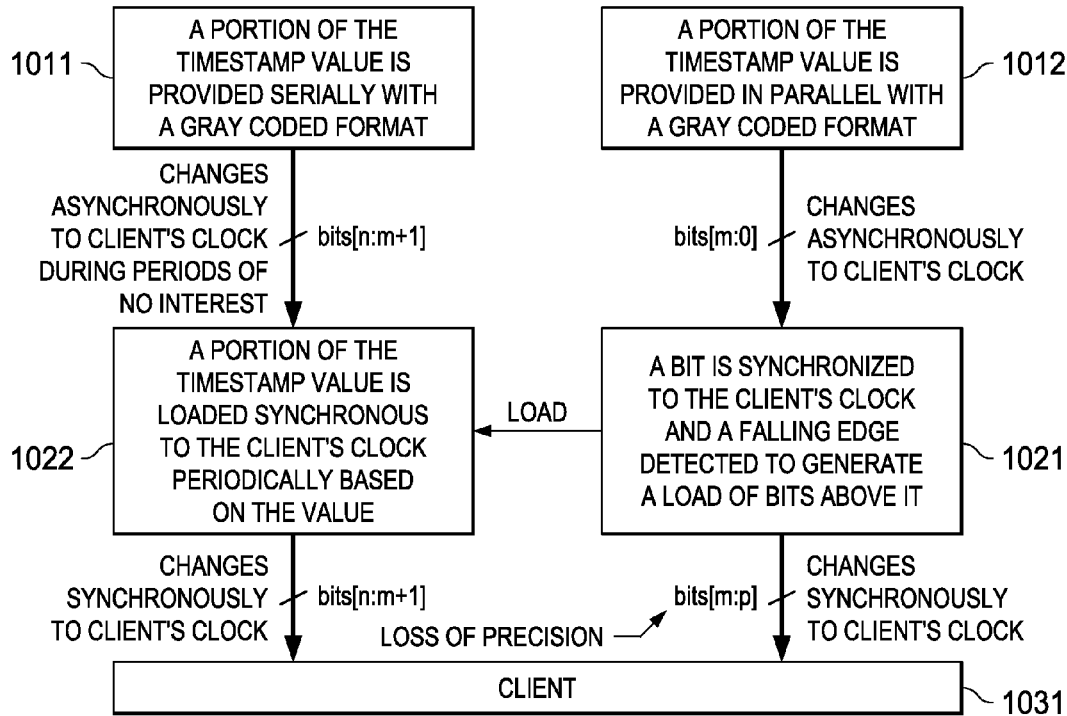
FIG. 10 illustrates schematically a second embodiment of timestamp value transmission of this invention.
Figure 11:
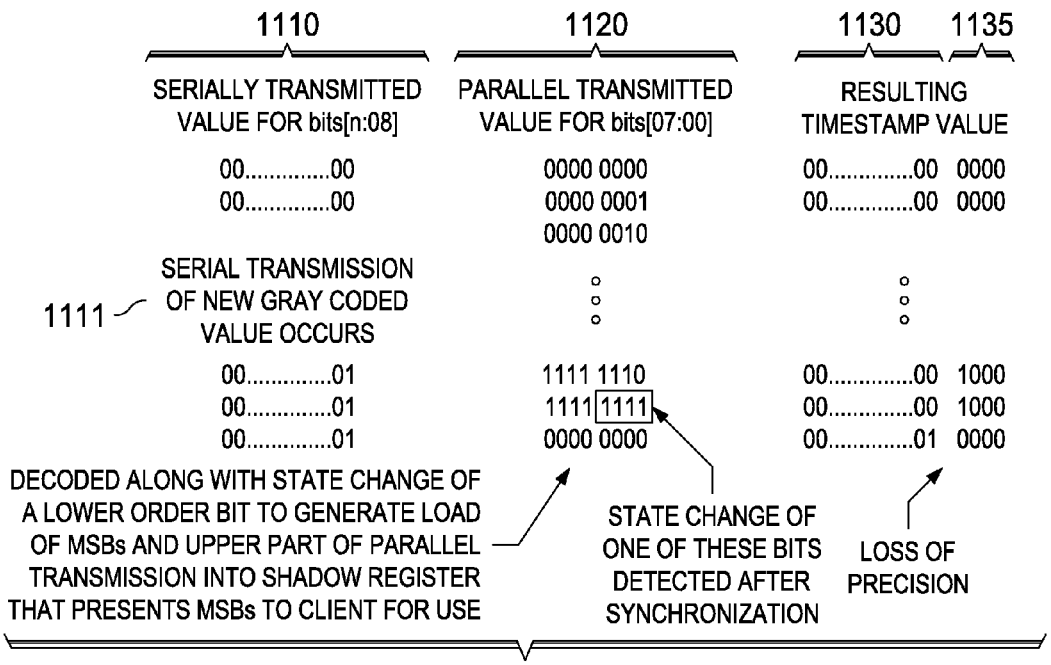
FIG. 11 illustrates an example of the embodiment of FIG. 10.

FIGS. 10 to 12 illustrate the second technique (Gray coded MSBs and binary coded LSBs). FIG. 10 illustrates the timestamp value transmission schematically. First timestamp source 1011 supplies MSBs of a timestamp value of serial bits [n,m+1] as an asynchronous Gray coded value. The MSB asynchronous Gray coded value is transmitted during periods of no interest. Because these MSBs change slowly this is generally possible. Second timestamp source 1012 supplies LSBs of a timestamp value of parallel bits [m,p] as an asynchronous binary coded value. The LSB asynchronous Gray coded value is asynchronous to the client clock. First synchronizer 1021 synchronizes each bit of the LSBs bits [m,p] to the client clock. Second synchronizer 1022 keeps a timestamp value corresponding to the MSBs in a shadow register as updated by first timestamp source 1011. Second synchronizer 1022 supplies the MSBs of the timestamp value synchronous with the client clock as triggered by a load signal from first synchronizer 1021 to client 1031. This load is triggered by a rollover within the LSBs. Client 1031 receives the MSB bits [n:m+1] from second synchronizer 1022 and the LSB bits [m:P] from first synchronizer 1021. All bits are received by client 1031 are synchronous with the client clock. Note that bits [p−1:0] are not transmitted to client 1031. This results in a loss of precision.

FIG. 11 illustrates an example of this operation. Column 1110 is the serial MSBs, column 1120 is the parallel LSBs and column 1130 is resultant complete timestamp value which includes bits to be discarded 1135. A toggle in LSBs 1120 at 1111 triggers the load of MSBs 1110. A rollover toggle in LSBs 1120 at 1111 triggers the load of MSBs 1110. A state change is detected at 1111 which marks this time to load the MSBs 1110. As previously noted, this serial portion of the MSBs is coded for the next value. Therefore the load triggered by the rollover in the LSBs loads the correct value. As previously described discarded bits 1135 are not transmitted to client 1131.

FIG. 12 illustrates the manner of transmitting the serial MSBs. Time slots 1201, 1203, 1205 and 1207 signal when a rollover toggle occurs in the LSBs. During time slot 1202 the serial MSBs for the value 1 are transmitted to second synchronizer 1022. This value 1 is loaded into client 1031 upon the value 1 signal in time slot 1203. During time slot 1204 the serial MSBs for the value 2 are transmitted to second synchronizer 1022. This value 2 is loaded into client 7101 upon the value 2 signal in time slot 1205. During time slot 1206 the serial MSBs for the value 3 are transmitted to second synchronizer 1022. This value 3 is loaded into client 731 upon the value 3 signal in time slot 1207. Note that bits

[3:0] of LSBs 1130 are discarded and not transmitted to client 1031. This represents a loss of precision in the timestamp value.

Figure 13:
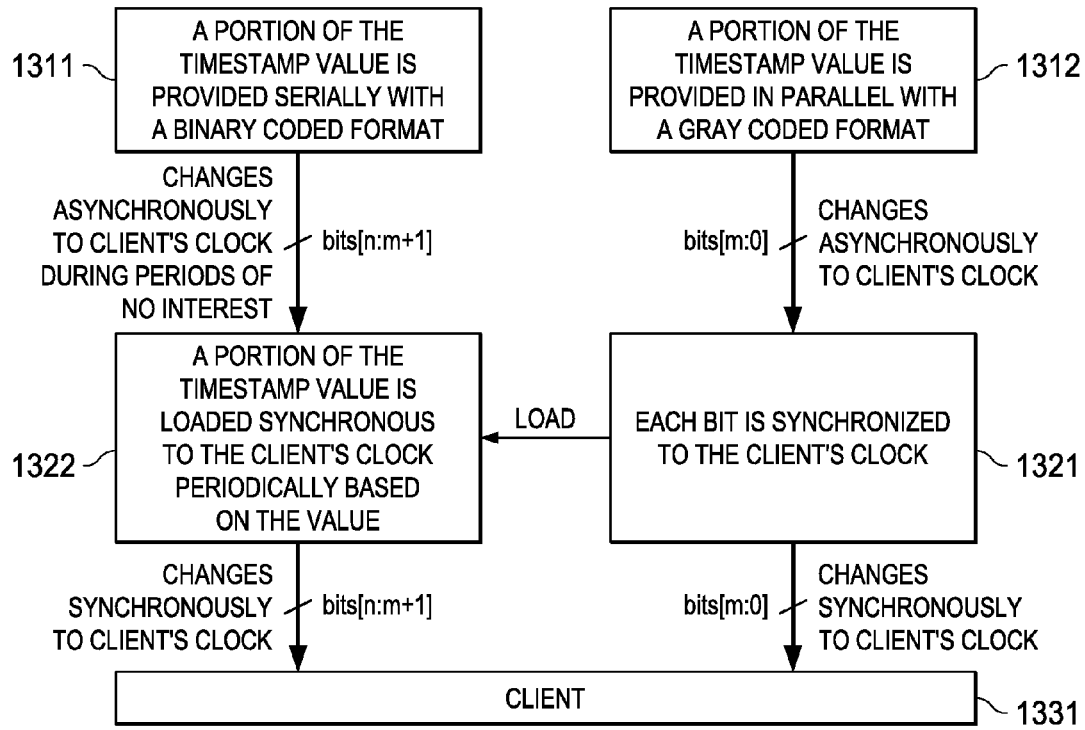
FIG. 13 illustrates schematically a third embodiment of timestamp value transmission of this invention.
Figure 14:
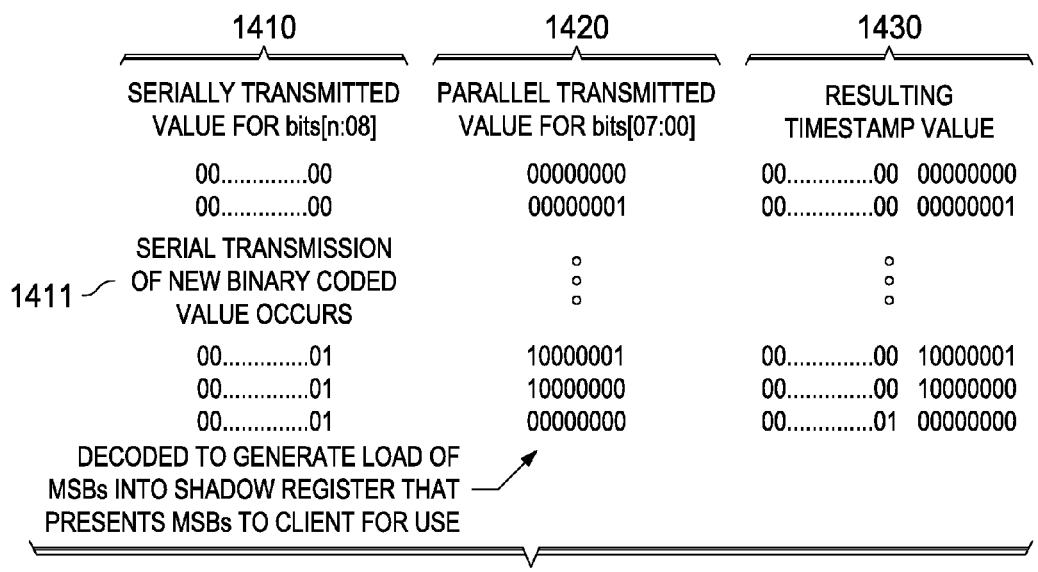
FIG. 14 illustrates an example of the embodiment of FIG. 13.
Figure 15:
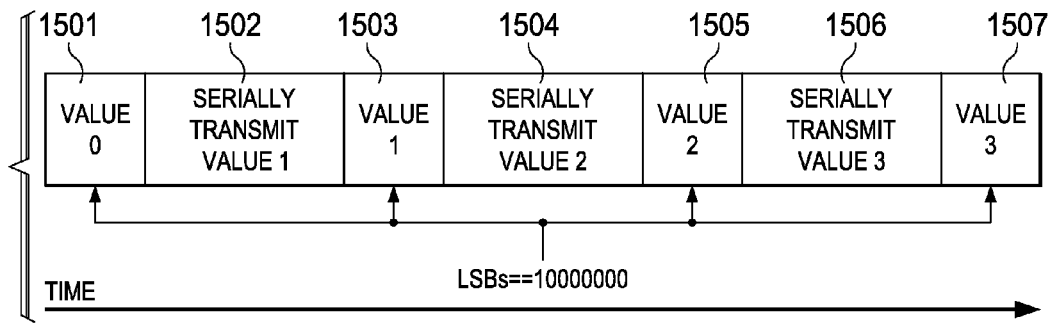
FIG. 15 illustrates the manner of transmitting the serial most significant bits of the time stamp value of the embodiment of FIG. 13.

FIGS. 13 to 15 illustrate the third technique (binary coded MSBs and Gray coded LSBs). FIG. 13 illustrates the timestamp value transmission schematically. First timestamp source 1311 supplies MSBs of a timestamp value of serial bits [n,m+1] as an asynchronous binary coded value. The MSB asynchronous binary coded value is transmitted during periods of no interest. Because these MSBs change slowly this is generally possible. Second timestamp source 1312 supplies LSBs of a timestamp value of parallel bits [m,0] as an asynchronous Gray coded value. The LSB asynchronous Gray coded value is asynchronous to the client clock. First synchronizer 1321 synchronizes each bit of the LSBs bits [m,0] to the client clock. Second synchronizer 1322 keeps a timestamp value corresponding to the MSBs in a shadow register as updated by first timestamp source 1311. Second synchronizer 1322 supplies the MSBs of the timestamp value synchronous with the client clock as triggered by a load signal from first synchronizer 1321 to client 1331. This load is triggered by a rollover within the LSBs. Client 1331 receives the MSB bits [n:m+1] from second synchronizer 1322 and the LSB bits [m:0] from first synchronizer 1321. All bits are received by client 1331 are synchronous with the client clock.

FIG. 14 illustrates an example of this operation. Column 1410 is the serial MSBs, column 1420 is the parallel LSBs and column 1430 is resultant complete timestamp value. A rollover toggle in LSBs 1420 at 1411 triggers the load of MSBs 1410. As previously noted, this serial portion of the MSBs is coded for the next value. Therefore the load triggered by the rollover in the LSBs loads the correct value.

FIG. 15 illustrates the manner of transmitting the serial MSBs. Time slots 1501, 1503, 1505 and 1507 signal when a rollover toggle occurs in the LSBs. During time slot 1502 the serial MSBs for the value 1 are transmitted to second synchronizer 1322. This value 1 is loaded into client 1331 upon the value 1 signal in time slot 1503. During time slot 1504 the serial MSBs for the value 2 are transmitted to second synchronizer 1222. This value 2 is loaded into client 1331 upon the value 2 signal in time slot 1505. During time slot 1506 the serial MSBs for the value 3 are transmitted to second synchronizer 1322. This value 3 is loaded into client 1331 upon the value 3 signal in time slot 1507.

Figure 16:
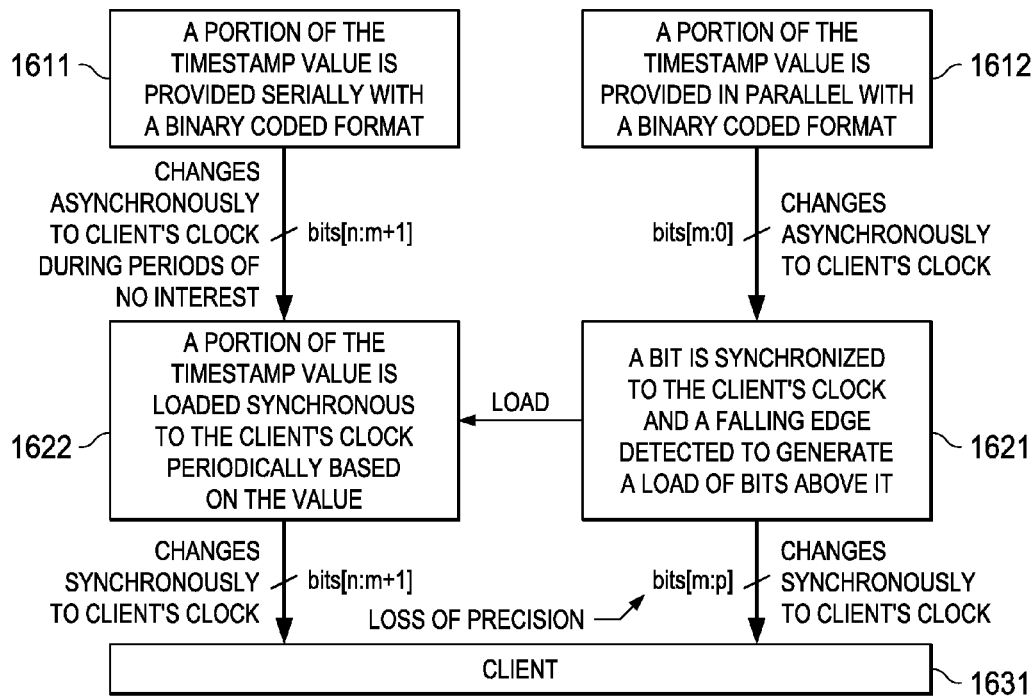
FIG. 16 illustrates schematically a fourth embodiment of timestamp value transmission of this invention.
Figure 18:
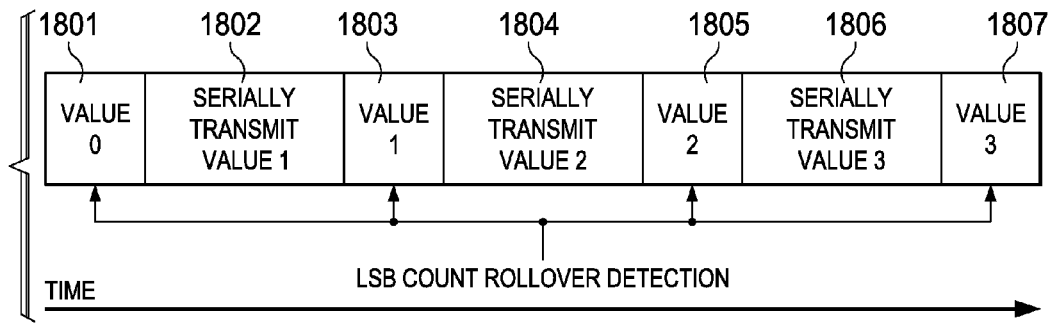
FIG. 18 illustrates the manner of transmitting the serial most significant bits of the time stamp value of the embodiment of FIG. 16.
Figure 17:
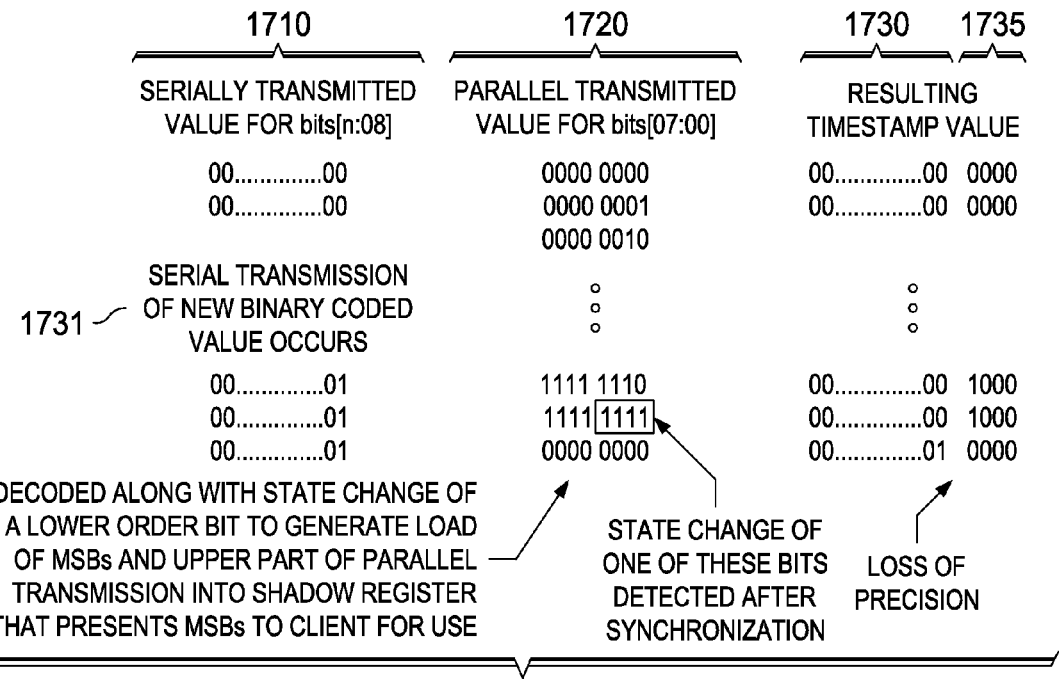
FIG. 17 illustrates an example of the embodiment of FIG. 16.

FIGS. 16 to 18 illustrate the fourth technique (binary coded MSBs and binary coded LSBs). FIG. 16 illustrates the timestamp value transmission schematically. First timestamp source 1611 supplies MSBs of a timestamp value of serial bits [n,m+1] as an asynchronous binary coded value. The MSB asynchronous Gray coded value is transmitted during periods of no interest. Because these MSBs change slowly this is generally possible. Second timestamp source 1612 supplies LSBs of a timestamp value of parallel bits [m,p] as an asynchronous binary coded value. The LSB asynchronous binary coded value is asynchronous to the client clock. First synchronizer 1621 synchronizes each bit of the LSBs bits [m,p] to the client clock. Second synchronizer 1622 keeps a timestamp value corresponding to the MSBs in a shadow register as updated by first timestamp source 1611. Second synchronizer 1622 supplies the MSBs of the timestamp value synchronous with the client clock as triggered by a load signal from first synchronizer 1621 to client 1631. This load is triggered by a rollover within the LSBs. Client 1631 receives the MSB bits [n:m+1] from second synchronizer 1622 and the LSB bits [m:p] from first synchronizer 1611. All bits are received by client 1631 are synchronous with the client clock. Note that bits [p−1:0] are not transmitted to client 1031. This results in a loss of precision.

FIG. 17 illustrates an example of this operation. Column 1710 is the serial MSBs, column 1720 is the parallel LSBs and column 1730 is resultant complete timestamp value which includes bits to be discarded 1735. A toggle in LSBs 1720 at 1711 triggers the load of MSBs 1710. A rollover toggle in LSBs 1720 at 1711 triggers the load of MSBs 1710. A state change is detected at 1711 which marks this time to load the MSBs 1710. As previously noted, this serial portion of the MSBs is coded for the next value. Therefore the load triggered by the rollover in the LSBs loads the correct value. As previously described discarded bits 1735 are not transmitted to client 1731.

FIG. 18 illustrates the manner of transmitting the serial MSBs. Time slots 1801, 1803, 1805 and 1807 signal when a rollover toggle occurs in the LSBs. During time slot 1802 the serial MSBs for the value 1 are transmitted to second synchronizer 1622. This value 1 is loaded into client 1631 upon the value 1 signal in time slot 1803. During time slot 1804 the serial MSBs for the value 2 are transmitted to second synchronizer 1622. This value 2 is loaded into client 1631 upon the value 2 signal in time slot 1805. During time slot 1806 the serial MSBs for the value 3 are transmitted to second synchronizer 1622. This value 3 is loaded into client 1631 upon the value 3 signal in time slot 1807. Note that bits [3:0] of LSBs 1730 are discarded and not transmitted to client 1631. This represents a loss of precision in the timestamp value.

The second and fourth techniques have a loss in precision of the timestamp. Synchronization of one of the binary count values and its edge detection introduces a latency. This latency causes a truncation of timestamp precision.

There are several techniques for the serial transmission of the MSBs of the timestamp. FIG. 19 illustrates a serial clock independent of the client clock. This serial clock is used to transfer the MSBs of the timestamp value to synchronizer for the MSBs. The serial clock triggers a read of serial timestamp_in in synchronism. This forms time_stamp_sr_value in the shadow register. The load_timestamp_value signal is triggered by a rollover toggle of the timestamp LSBs. This triggers a load of the accumulated serial MSBs (timestamp_MSBs) to the client in synchronism with client clock.

Figure 20:
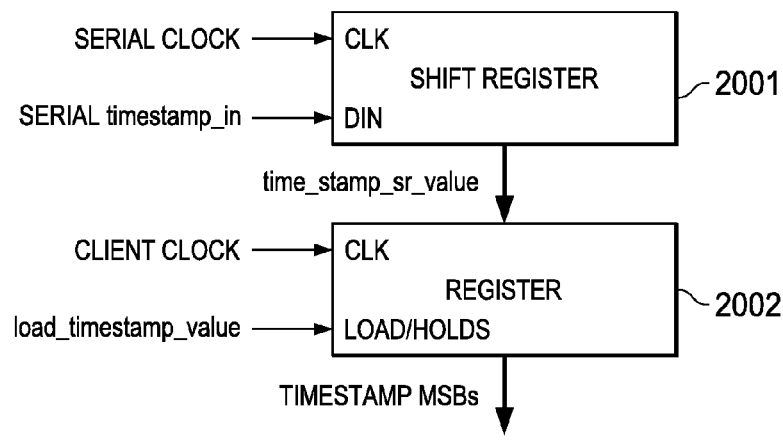
FIG. 20 illustrates hardware for practicing the embodiment illustrated in FIG. 19.

FIG. 20 illustrates hardware to implement the technique illustrated in FIG. 19. Shift register 2001 is clocked by the serial clock. Upon each instance of the serial clock shift register 2001 accumulates the timestamp data serial timestamp_in. The accumulated value within shift register 2001 is designated time_stamp_sr_value. When the load_timestamp_value signal is active commanding a load operation, register 2002 loads time_stamp_sr_value from shift register 2001 upon the next client clock. Once loaded into register 2002 the value is available to the client in parallel form as Timestamp MSBs.

FIG. 21 illustrates a second embodiment including an enable signal. This enable signal controls transfer of the MSBs of the timestamp value to synchronizer for the MSBs. A shift signal triggers a read of serial timestamp_in on the next client clock following the enable signal serial_timestamp_enable. This forms time_stamp_sr_value in the shadow register. The load_timestamp_value signal is triggered by a rollover toggle of the timestamp LSBs. This triggers a load of the accumulated serial MSBs (timestamp_MSBs) to the client in synchronism with client clock.

Figure 22:
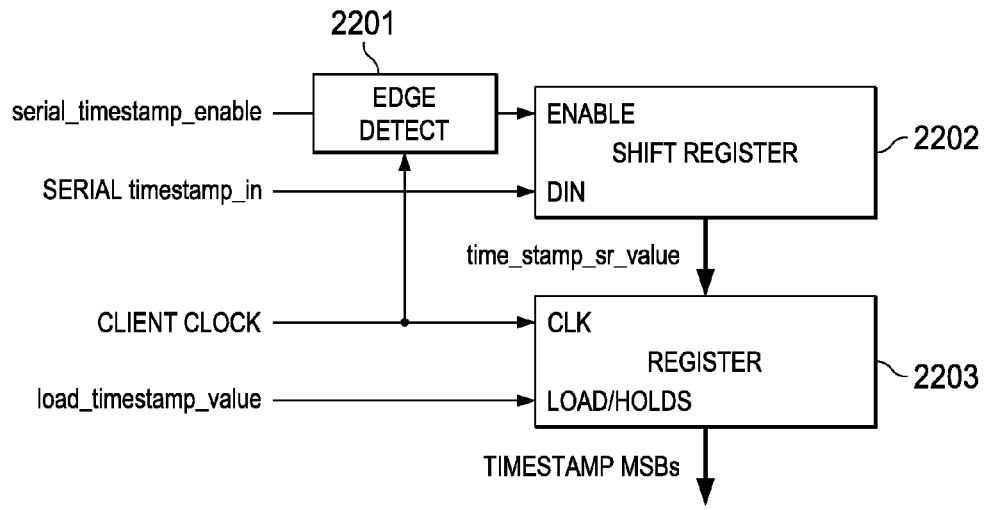
FIG. 22 illustrates hardware for practicing the embodiment illustrated in FIG. 21.

FIG. 22 illustrates hardware to implement the technique illustrated in FIG. 21. Edge detector 2201 is enabled by serial_timestamp_enable. Edge detector 2201 triggers upon the next clock edge from client clock. Edge detector 2201 enabled shift register 2201. Upon each enable signal from edge detector 2201 serial clock shift register 2202 accumulates the timestamp data serial timestamp_in. The accumulated value within shift register 2202 is designated time_stamp_sr_value. When the load_timestamp_value signal is active commanding a load operation, register 2203 loads time_stamp_sr_value from shift register 2202 upon the next client clock. Once loaded into register 2203 the value is available to the client in parallel form as Timestamp MSBs.

Figure 23:
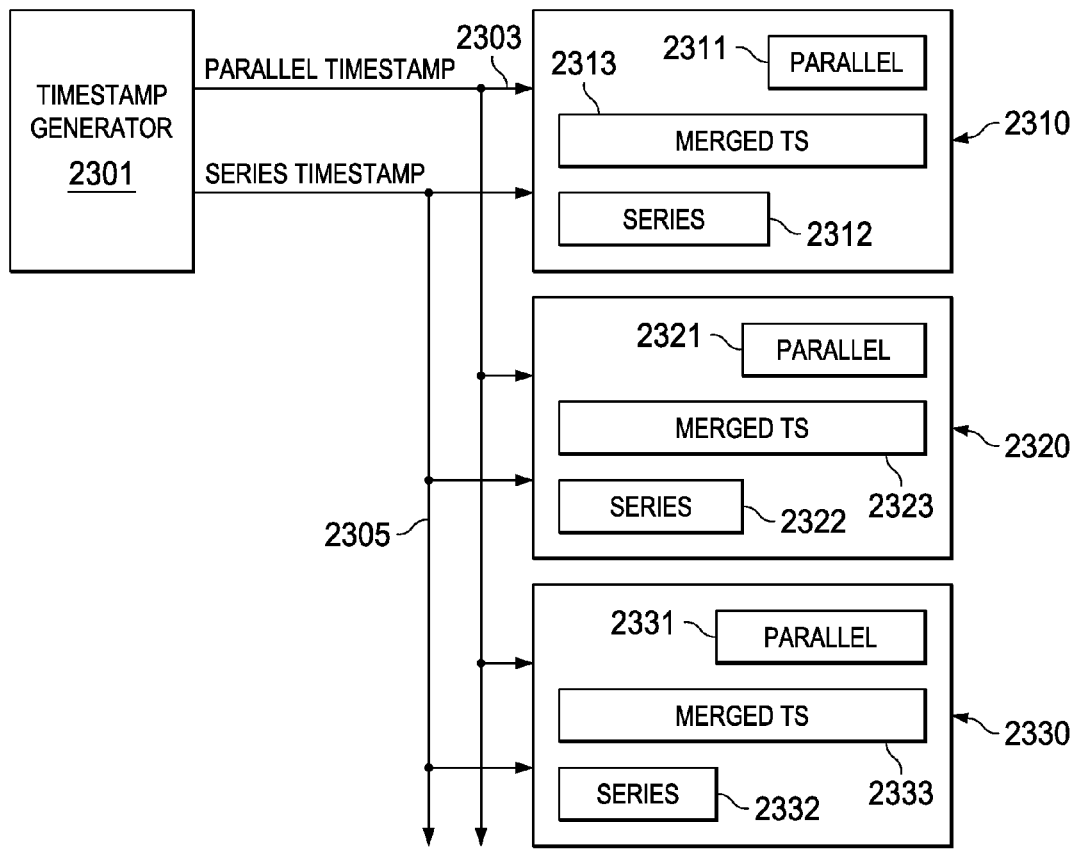
FIG. 23 illustrates hardware for distribution of the timestamp value according to this invention.

FIG. 23 illustrates distribution of the timestamp value according to this invention. Timestamp generator 2301 produces the timestamp value including both the MSBs and the LSBs. Timestamp generator supplies the LSBs of the timestamp value in parallel on parallel timestamp bus 2303. This includes data lines equal in number to the number of data bits in the timestamp LSBs. Timestamp generator supplies the MSBs of the timestamp value sequentially in series on serial timestamp bus 2305. This includes a single data line to transmit all the timestamp MSBs. Both parallel timestamp bus 2303 and serial timestamp bus 2305 are connected to clients 2310, 2320 and 2330. This will describe representative client 2310. Parallel register 2311 receives the parallel LSBs of the timestamp value from parallel timestamp bus 2303. Series register 2312 receives the serial MSBs from serial timestamp bus 2305 in the manner described above in conjunction with FIGS. 19 to 22. As detailed above the timestamp MSBs are serially accumulated and captured upon each load_timestamp_value signal. Merged timestamp register 2313 is connected to both parallel register 2311 and series register 2312 to assemble the timestamp value. The timestamp value stored in merged timestamp register 2313 is used as known in the prior art to capture the time of trace data used for debug.

Within a system, there may be a number of clock domains operating at a different frequency. It may be advantageous to serially transmit s different number of bits of the timestamp serially for each of the domains depending on the client clock frequency. The ratio between parallel LSBs and serial MSBs depends upon the timestamp precision required relative to the serial data transmission rate. The serial timestamp bus 2305 must be able to transmit all timestamp MSBs between each rollover toggle of the timestamp LSBs. Different client clock rates may require differing ratios of MSBs to LSBs.

What is claimed is:

1. A process of conveying timestamp values to client domains in an integrated circuit, the client domains having client clock signals operating at different frequencies comprising:
   generating asynchronously with the client clock signals a timestamp datum having most significant bits and least significant bits;
   transmitting in parallel the least significant bits of the timestamp datum to a first synchronizer at each client;
   transmitting in series the most significant bits of the timestamp datum to a second synchronizer at each client;
   receiving in parallel and storing in the first synchronizer the least significant bits of the timestamp datum;
   receiving in series and storing in the second synchronizer the most significant bits of the timestamp datum; and
   transferring the least significant bits from the first synchronizers and the most significant bits from the second synchronizers to the clients synchronous with the client clock signals.

2. The process of claim 1 in which the receiving in series and storing the most significant bits of the timestamp datum includes:
   capturing a bit in a shift register of the most significant bits of the timestamp datum and shifting previously stored data upon each serial clock, and
   loading data from the shift register into a register when a load input indicates a load operation.

3. The process of claim 2 in which the step of loading data includes loading data upon each rollover toggle of the least significant bits.

4. The process of claim 1 in which the receiving in series and storing the most significant bits of the timestamp includes:
   detecting an edge upon a next predetermined edge of a client clock signal when enabled by a serial timestamp enable signal;
   capturing a bit in a shift register of the most significant bits of the timestamp and shifting previously stored data upon each detected edge; and
   loading data from the shift register into a register when a load input indicates a load operation.

5. The process of claim 4 in which loading data includes loading data upon each rollover toggle of the least significant bits.

6. The process of claim 1 in which the generating includes generating the most significant bits in Gray code and the least significant bits in Gray code.

7. The process of claim 1 in which the generating includes generating the most significant bits in Gray code and the least significant bits in binary code.

8. The process of claim 1 in which the generating includes generating the most significant bits in binary code and the least significant bits in Gray code.

9. The process of claim 1 in which the generating includes generating the most significant bits in binary code and the least significant bits in binary code.

10. The process of claim 1 in which the transmitting in parallel and transmitting in series include transmitting asynchronously with the client clock signals.

11. The process of claim 1 in which the transmitting in parallel includes transmitting less than all of the least significant bits.

12. The process of claim 1 in which the transmitting in parallel includes transmitting all of the least significant bits.

13. The process of claim 1 in which the generating includes generating at a frequency greater than the client clock frequencies.

* * * * *